(12) United States Patent
Beschta et al.

(10) Patent No.: US 11,634,298 B2
(45) Date of Patent: Apr. 25, 2023

(54) HORIZONTAL WIRE FEED SPOOL DELIVERY SYSTEM

(71) Applicant: Illinois Tool Works Inc., Glenview, IL (US)

(72) Inventors: Mark Beschta, Greenville, WI (US); Erik Brown, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 242 days.

(21) Appl. No.: 17/072,210

(22) Filed: Oct. 16, 2020

(65) Prior Publication Data

US 2022/0119218 A1 Apr. 21, 2022

(51) Int. Cl.
 *B23K 9/133* (2006.01)
 *B65H 49/32* (2006.01)
 *B65H 57/06* (2006.01)
 *B65H 57/18* (2006.01)
 *B65H 51/10* (2006.01)

(52) U.S. Cl.
 CPC .......... *B65H 51/10* (2013.01); *B23K 9/1333* (2013.01); *B23K 9/1336* (2013.01); *B65H 49/328* (2013.01); *B65H 57/06* (2013.01); *B65H 57/18* (2013.01)

(58) Field of Classification Search
 CPC .. B23K 9/1333; B23K 9/1336; B65H 49/328; B65H 57/06; B65H 57/18; B65H 51/10
 See application file for complete search history.

(56) References Cited

U.S. PATENT DOCUMENTS

| | | | | |
|---|---|---|---|---|
| 3,440,394 A | * | 4/1969 | Meyer | B23K 9/1333 219/137.9 |
| 4,433,816 A | * | 2/1984 | Rousseau | B65H 57/26 242/157 R |
| 6,549,441 B1 | * | 4/2003 | Aigner | B23K 9/095 219/130.21 |
| 2013/0048621 A1 | * | 2/2013 | Christopher | B65H 57/18 219/137.7 |

* cited by examiner

*Primary Examiner* — William E Dondero
(74) *Attorney, Agent, or Firm* — McAndrews, Held & Malloy, Ltd.

(57) ABSTRACT

Disclosed are systems and methods for feeding welding wire for welding-type applications. The wire-feeder system comprises a base platform, a spool hub, a drive roll assembly, and a wire guide assembly. The spool hub can be mounted to the base platform perpendicular to the base platform and configured to support a wire spool. The drive roll assembly can be mounted to the base platform, and having one or more sets of drive rollers configured to feed wire from the wire spool toward a welding torch. The wire guide assembly can be mounted to the base platform separately from both the wire spool and the drive roll assembly.

21 Claims, 6 Drawing Sheets

HORIZONTAL WIRE FEED SPOOL DELIVERY SYSTEM

BACKGROUND

In some welding-type applications, a welding wire feeder may be used to feed welding wire from a wire spool to a welding torch for a welding operation. In some welding-type operations, it may be desirable for welding wire feeders to be portable and/or stackable.

SUMMARY

The present disclosure relates generally to welding systems and, more particularly, to welding wire feeders and welding wire-feeder systems, substantially as illustrated by and described in connection with at least one of the figures, as set forth more completely in the claims.

According to a first aspect, a wire-feeder system comprises: a base platform; a spool hub mounted to the base platform perpendicular to the base platform and configured to support a wire spool; a drive roll assembly mounted to the base platform, and having one or more sets of drive rollers configured to feed wire from the wire spool toward a welding torch; and a wire guide assembly mounted to the base platform separately from both the wire spool and the drive roll assembly, the wire guide assembly configured to guide the wire from the wire spool supported on the spool hub to the one or more sets of drive rollers.

In certain aspects, each drive roller of the one or more sets of drive rollers is configured to rotate about an axis of rotation that is perpendicular to the base platform.

In certain aspects, the base platform is horizontal.

In certain aspects, the base platform comprises a plurality of supports to support a second wire-feeder system above the base platform.

In certain aspects, the plurality of supports comprises at least three supports to support a base platform of the second wire-feeder system.

In certain aspects, the wire guide assembly comprises a first guide feature having a first wire pass-through and a second guide feature having a second wire pass-through, wherein each of the first guide feature and the second guide feature protrude from the base platform.

In certain aspects, the first guide feature and the second guide feature are each removably coupled to the wire guide assembly.

In certain aspects, the first guide feature is positioned between the wire spool and the second guide feature.

In certain aspects, the first wire pass-through is larger than the second wire pass-through.

In certain aspects, the wire guide assembly comprises a wire pass-through that is tapered from an inlet to an outlet.

In certain aspects, the base platform comprises a plurality of wheels to allow the base platform to move across a surface.

In certain aspects, the base platform comprises a set of forklift pockets.

In certain aspects, the base platform comprises a hoist attachment to enable the base platform to be suspended.

In certain aspects, the wire-feeder system is configured to drive wire having a diameter that is between 1/16 and 1/8 inches.

According to a second aspect, a method for configuring a wire-feeder system in a welding-type system comprises: loading a wire spool to a spool hub mounted to a base platform, wherein the spool hub 150 is perpendicular to the base platform; passing welding wire from the wire spool to a wire guide assembly that is separate from the wire spool; and driving the welding wire from the wire guide assembly to a welding torch via a drive roll assembly having one or more sets of drive rollers.

In certain aspects, the method further comprises the step of stacking a second wire-feeder system on top of the wire-feeder system.

In certain aspects, each drive roller of the one or more sets of drive rollers is configured to rotate about an axis of rotation that is perpendicular to the base platform.

According to a third aspect, a wire-feeder system comprises: a base platform; a spool hub mounted to the base platform perpendicular to the base platform and configured to support a wire spool; a drive roll assembly mounted to the base platform, and having one or more sets of drive rollers configured to feed wire from the wire spool toward a welding torch, wherein each drive roller of the one or more sets of drive rollers is configured to rotate about an axis of rotation that is perpendicular to the base platform; and a wire guide assembly mounted to the base platform separately from both the wire spool and the drive roll assembly, the wire guide assembly configured to guide the wire from the wire spool supported on the spool hub to the one or more sets of drive rollers, wherein the wire guide assembly comprises a first guide feature having a first wire pass-through and a second guide feature having a second wire pass-through.

In certain aspects, the first guide feature is positioned between the wire spool and the second guide feature, and wherein the first wire pass-through is larger than the second wire pass-through.

In certain aspects, the base platform comprises a set of forklift pockets.

In certain aspects, the base platform comprises a plurality of supports to support a second wire-feeder system stacked above the base platform.

DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 3b illustrates a rear perspective view of the example wire guide assembly of FIG. 3a.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

The term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

The terms "circuit" and "circuitry" includes any analog and/or digital components, power and/or control elements, such as a microprocessor, digital signal processor (DSP), software, and the like, discrete and/or integrated components, or portions and/or combinations thereof.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards, that form part or all of a controller, and are used to control a welding process, a device such as a power source or wire feeder, motion, automation, monitoring, air filtration, displays, and/or any other type of welding-related system.

The term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

The term "torch," "welding torch," "welding tool," or "welding-type tool" refers to a device configured to be manipulated to perform a welding-related task, and can include a hand-held welding torch, robotic welding torch, gun, or other device used to create the welding arc.

The term "welding mode," "welding process," "welding-type process," or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

The present methods and systems may be realized in hardware, software, and/or a combination of hardware and software. Example implementations include an application specific integrated circuit and/or a programmable control circuit. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

In some welding-type operations, such as gas metal arc welding (GMAW), welding wire may be fed by a wire feeder to a torch for a welding operation. Welding large weldments, such as those used for buildings, structural members, rail, mining, off-shore, and the like, often employ heavy weld spools with weld wire having a larger diameter. For example, larger weldments sometime run spools of wire that have a diameter of 1/8 or 3/32 inches. Depending on the spooled wire length, these spools can weight about 25 to 100 pounds, typically about 50 to 60 pounds. Existing wire feeders typically employ a vertically-mounted wire spool assembly that directs the wire to the driver roller via various wire guides coupled to the vertically-mounted wire spool assembly or the driver roller. In some applications or job sites, it may be desirable to move the wire feeder to different locations at the job site in order to avoid driving the wire from the wire feeder to the torch over a long distance. Therefore, it is also desirable for wire feeders to be portable.

Employing heavy, larger diameter wire increases the wear and tear on the welding equipment, while also making it more difficult to store and to transport around the job site. For example, existing systems can suffer from inlet guide wear, drive assembly wear, mobility concerns, and a need for improved over all ruggedness for the large weldment environment. As can be appreciated, addressing these issues would result in less equipment down time, less repair, and increased mobility/safety. Further, as will be described, the wire feeder disclosed herein will also be easier to stack, store, and deploy; thus, improving fleet management.

The present disclosure relates to a wire-feeder system that includes a horizontally-mounted wire spool assembly and an external wire guide assembly. Employing a horizontally-mounted wire spool assembly and an external wire guide assembly can offer a number of advantages. For example, it is easier to load and unload a horizontally-mounted wire spool (e.g., a fifty or sixty pound spool of welding wire). Further, mounting the wire spool horizontally improves the weight distribution, thus improving the ability to move the feeder. Additionally, a horizontally-mounted wire spool design improves storage and deployment of the wire-feeder system (e.g., on a cart, sled, with the power source, forklift, casters, etc.). For example, a wire-feeder system with a horizontally-mounted wire spool is more compact, balanced, and may be more easily stacked. Finally, the external wire guide assembly improves the longevity of the drive system by reducing the load on the inlet guides and drive assemblies. An external wire guide assembly can also more readily repaired or replaced. Therefore, the wire-feeder system of the present disclosure may feed weld wire of a larger diameter as compared to conventional suitcase wire feeders while increasing reliability, portability, and ease of use on the jobsite.

Figure 1:
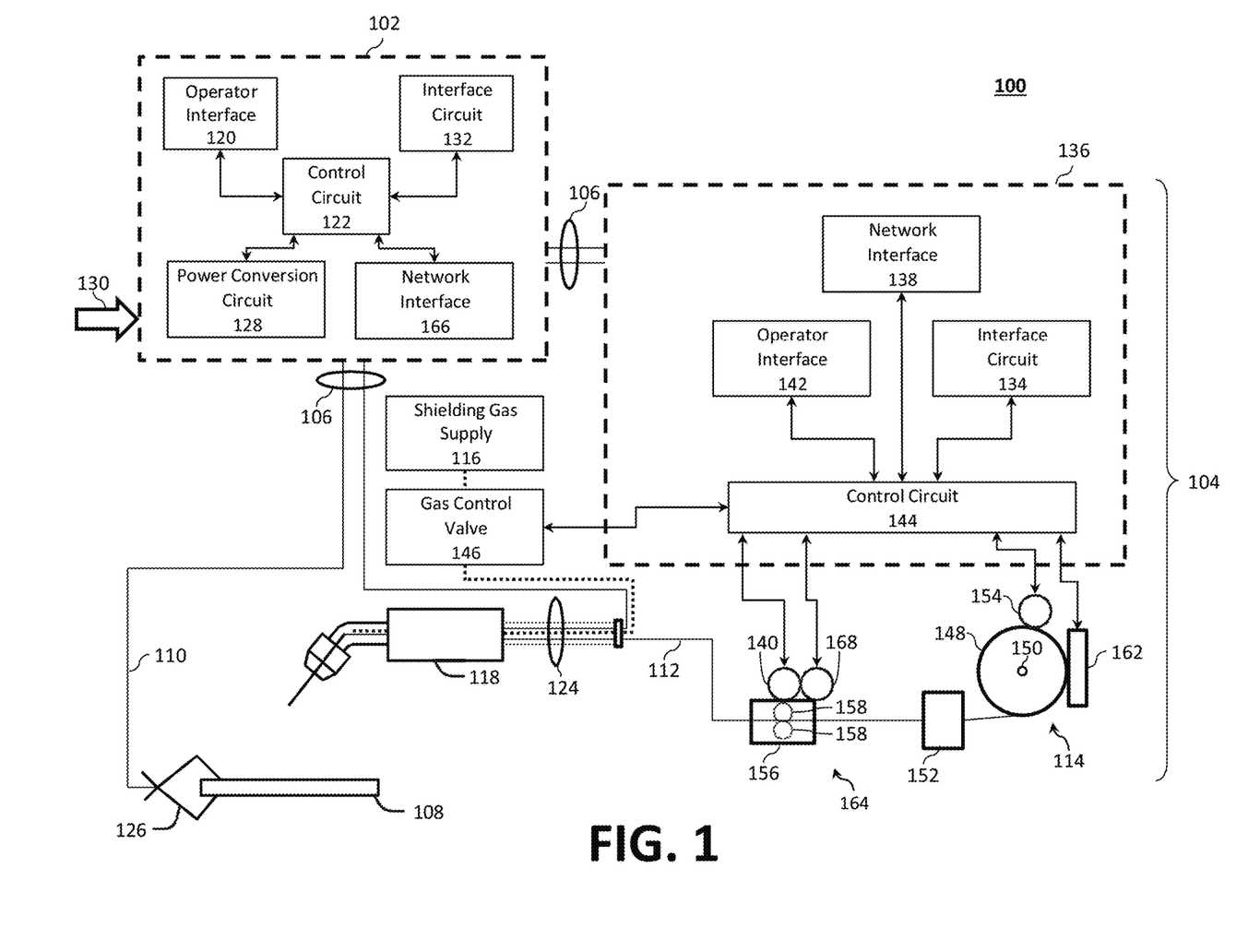
FIG. 1 illustrates an example welding system, in accordance with aspects of this disclosure.

FIG. 1 illustrates an example welding system 100 for performing welding-type operations. As shown in the welding system 100 of FIG. 1, a power supply 102 and a wire-feeder system 104 are coupled via conductors or conduits 106. In the illustrated example, the power supply 102 is separate from the wire-feeder system 104, such that the wire-feeder system 104 may be positioned near a welding location at some distance from the power supply 102. Terminals are typically provided on the power supply 102 and on the wire-feeder system 104 to allow the conductors or conduits 106 to be coupled to the systems so as to allow for power and gas to be provided to the wire-feeder system 104 from the power supply 102, and to allow data to be exchanged between the two devices.

The system 100 is configured to provide welding wire 112 from a welding wire source 114, power from the power supply 102, and shielding gas from a shielding gas supply 116, to a welding torch 118. The welding torch 118 may be any type of arc welding torch, (e.g., GMAW, GTAW, FCAW) and may allow for the feed of a welding wire 112 (e.g., an electrode wire) and gas to a location adjacent to a welding work piece 108. A work cable 110 is run to the welding work piece 108 so as to complete an electrical circuit between the power supply 102 and the welding work piece 108 via a clamp 126.

The welding system 100 is configured for weld settings (e.g., weld parameters, such as voltage, wire feed speed, current, gas flow, inductance, physical weld parameters, advanced welding programs, pulse parameters, etc.) to be selected by the operator and/or a welding sequence, such as via an operator interface 120 provided on the power supply 102. The operator interface 120 will typically be incorporated into a front faceplate of the power supply 102, and may allow for selection of settings such as the weld process, the type of wire to be used, voltage and current settings, and so forth. In particular, the example system 100 is configured to allow for welding with various steels, aluminums, or other welding wire that is channeled through the welding torch 118. Further, the system 100 is configured to employ welding wires with a variety of wire sizes. For example, between 1/16 and 1/8 inches, though other sizes are contemplated. These weld settings are communicated to a control circuit 122 within the power supply 102. The system may be particularly adapted to implement welding regimes configured for certain electrode types.

The control circuit 122, operates to control generation of welding power output that is supplied to the welding wire 112 for carrying out the desired welding operation.

The welding torch 118 applies power from the power supply 102 to the welding wire 112, typically by a welding cable 124. Similarly, shielding gas from a shielding gas supply 116 is fed through the wire-feeder system 104 and the welding cable 124. During welding operations, the welding wire 112 is advanced through a jacket of the welding cable 124 towards the welding torch 118 via the wire-feeder system 104.

The work cable 110 and clamp 126 allow for closing an electrical circuit from the power supply 102 through the welding torch 118, the welding wire 112 (electrode), and the welding work piece 108 for maintaining the welding arc during the operation.

The control circuit 122 is coupled to power conversion circuit 128. This power conversion circuit 128 is adapted to create the output power, such as pulsed waveforms applied to the welding wire 112 at the welding torch 118. Various power conversion circuits may be employed, including choppers, boost circuitry, buck circuitry, inverters, converters, and/or other switched mode power supply circuitry, and/or any other type of power conversion circuitry. The power conversion circuit 128 is coupled to a source of electrical power as indicated by arrow 130. The power applied to the power conversion circuit 128 may originate in the power grid, although other sources of power may also be used, such as power generated by an engine-driven generator, batteries, fuel cells, or other alternative sources. The power supply 102 illustrated in FIG. 1 may also include an interface circuit 132 configured to allow the control circuit 122 to exchange signals with the wire-feeder system 104. The power supply 102 may comprise a network interface 166 configured to communicate data (e.g., measurements, commands, etc.) with another device; whether a remote server, computer, or the wire-feeder system 104 (via its network interface 138).

The wire-feeder system 104 includes a complimentary interface circuit 134 that is coupled to the interface circuit 132. In some examples, multi-pin interfaces may be provided on both components and a multi-conductor cable run between the interface circuit to allow for such information as wire feed speeds, processes, selected currents, voltages or power levels, and so forth to be set on either the power supply 102, the wire-feeder system 104, or both. Additionally or alternatively, the interface circuit 134 and the interface circuit 132 may communicate wirelessly and/or via the weld cable.

The wire-feeder system 104 includes a wire feed controller 136 operatively coupled to the welding wire source 114, the first wire feeder motor 140, etc. The wire feed controller 136 may comprise a network interface 138, an operator interface 142, an interface circuit 134, and a control circuit 144. The wire-feeder system 104 also includes control circuit 144 coupled to the interface circuit 134. As described below, the control circuit 144 allows for wire feed speeds to be controlled in accordance with operator selections and/or stored sequence instructions, and permits these settings to be fed back to the power supply 102 via the interface circuit 134. The control circuit 144 is coupled to an operator interface 142 on the wire feeder that allows selection of one or more welding parameters, particularly wire feed speed. The operator interface may also allow for selection of such weld parameters as the process, the type of wire utilized, current, voltage or power settings, and so forth. The control circuit 144 may also be coupled to gas control valving 146 which regulates and measures the flow of shielding gas from the shielding gas supply 116 to the welding torch 118 via the conductors or conduits 106. In general, such gas is provided at the time of welding, and may be turned on immediately preceding the weld and for a short time following the weld operation. The shielding gas supply 116 may be provided in the form of pressurized bottles.

The wire-feeder system 104 includes components for feeding wire to the welding torch 118 and thereby to the welding operation, under the control of control circuit 144. A wire spool 148 is mounted on a spool hub 150 and configured to rotate relative to a structure (e.g., the base platform 202 described below) via the spool hub 150. The wire spool 148 is physically removable from the spool hub 150 of the wire-feeder system 104 to allow the user to replace the wire spool 148 as needed (e.g., when depleted). In some examples, the spool hub 150 is configured to support a wire spool 148 weighing between 25 and 100 pounds, or between 50 and 60 pounds. To accommodate the weight of the wire spool 148, the spool hub 150 may be fabricated from thicker gauge materials and/or comprise bearings (e.g., ball bearings) to enable the wire spool 148 to rotate more smoothly.

An inlet of the drive roll assembly 164 is connected to an outlet of the welding wire source 114 via one or more connectors and an external wire guide assembly 152. In some examples, however, the wire feeder inlet may be directly connected to the outlet of the welding wire source 114.

In operation, welding wire 112 is unspooled from the wire spool 148 and is progressively fed to the welding torch 118 by the drive roll assembly 164. The wire spool 148 may be associated with a clutch 154 that disengages the wire spool 148 when welding wire 112 is to be fed from the wire spool 148 to the welding torch 118. The clutch 154 may also be regulated, for example by the control circuit 144, to maintain a minimum friction level to avoid free spinning of the wire spool 148. The first wire feeder motor 140 of the drive roll assembly 164 may be provided within a housing 156 that engages with wire feed rollers 158 via a driving gear 160 to pull wire from the wire spool 148 and push it toward the welding torch 118. A second wire feeder motor may be provided (e.g., in push-pull arrangement) in the welding torch 118 to pull the welding wire 112 via a second drive roll assembly.

In practice, the driving gear 160 is mechanically coupled to the first wire feeder motor 140 and is rotated by the first wire feeder motor 140 to drive the wire from the wire spool 148. The driving gear 160 is mechanically coupled with one or more sets of wire feed rollers 158. As illustrated, each set of wire feed rollers 158 includes a set of two wire feed rollers 158 biased towards one another (with the welding wire 112 in between) to apply adequate pressure by the two rollers to the welding wire 112. In other aspects, where it is desirable to omit the driving gear 160, at least one of the wire feed rollers 158 is mechanically coupled to the first wire feeder motor 140. Some systems may include multiple rollers of this type, such as the dual drive roll assembly 164 represented in FIG. 2a, which has two sets of wire feed rollers 158. In some examples, the wire-feeder system 104 is configured to feed ⅛ inch wire. In some examples, the wire-feeder system 104 is configured to feed 3/32 inch wire.

A tachometer 168 or other sensor may be provided for detecting the speed of the first wire feeder motor 140, the wire feed rollers 158, or any other associated component so as to provide an indication of the actual wire feed speed. Signals from the tachometer 168 are fed back to the control circuit 144 such that the control circuit 144 can track the length of wire that has been fed. The length of wire may be used directly to calculate consumption of the wire and/or the length may be converted to wire weight based on the type of wire and its diameter.

When a wire spool 148 is installed, an operator may input information about the wire spool 148, for example via the operator interface 142. The control circuit 144 may receive this information and determine an initial amount of wire able to be fed from the wire spool 148, for example by weight or by length of wire. For example, the operator may input a spool serial number, and the control circuit 144 may determine a weight or length of wire by looking up the spool type in memory of the control circuit 144 or in an external database. In some examples, the user may input weight or wire length information and/or wire type information into the operator interface 142. The control circuit 144 can then track consumption of the wire, for example based on signals received from the tachometer 168.

The control circuit 144 may control the operator interface 142 to indicate when an amount of wire remaining in the wire spool 148 is less than a threshold amount. An operator may then be aware that the wire spool 148 should be replaced soon. In some examples, the operator interface 142 may display an amount of wire (e.g., by weight or length) remaining in the wire spool 148. In some examples, the control circuit 144 may send a command to stop or disable a welding operation when an amount of wire remaining in the wire spool 148 is less than a threshold amount.

In some examples, the welding wire source 114 includes a sensor 162 to determine an amount of wire remaining in the wire spool 148. For example, the sensor 162 may be a scale to measure the weight of the wire spool 148. Signals from the scale (sensor 162) are fed back to the control circuit 144 such that the control circuit 144 can track a consumption of welding wire by weight. As described above, the operator interface 142 may display an amount of wire remaining in the wire spool 148 (e.g., by weight or length) and/or indicate when an amount of wire remaining in the wire spool 148 is less than a threshold amount. In some examples, the control circuit 144 may send a command to stop or disable a welding operation when an amount of wire remaining in the wire spool 148 is less than a threshold amount. In some examples, rather than a scale, the sensor 162 may be a light sensor which measures approximately how much wire is left in the spool. In some examples, a light sensor may determine when an amount of wire remaining on the spool is less than a threshold amount. In some examples, multiple light sensors may be used to determine when the amount of wire remaining is at various threshold amounts.

In some examples, the wire-feeder system 104 may include a sensor 162 that detects when a welding wire source 114 is connected to the wire-feeder system 104. For example, the sensor 162 may be a radio frequency identification ("RFID") reader which reach a RFID tag on the wire spool 148. The RFID reader may receive information about the wire spool 148, for example a wire type, wire length, or wire weight. The information is sent to the control circuit 144. The control circuit 144 may track a consumption of the wire spool 148 based on the initial information received from the sensor 162 and/or monitoring use of the wire. The control circuit 144 may adjust one or more settings of the wire-feeder system 104 based on the wire type information. The control circuit 144 may also transmit the received wire type information to the power supply 102 (e.g., via the interface circuit 134). The control circuit 122 of the power supply 102 may then adjust one or more settings of the power supply 102 based on the received wire type. In some examples, the control circuit 144 of the wire-feeder system 104 or the control circuit 122 of the power supply 102 may determine whether a selected welding process or selected weld settings are compatible with the received wire type. In some examples, the operator interface (e.g., operator interfaces 120, 142) may indicate that the received wire type is not compatible with the selected welding process or selected weld settings. Other possible wireless technologies that the sensor 162 may use include Bluetooth, Bluetooth low energy, near field communication, ZigBee, RuBee, or the like.

As illustrated, the wire-feeder system 104 includes an external wire guide assembly 152 connected between the welding wire source 114 and the inlet of the drive roll assembly 164. The external wire guide assembly 152 guides wire received from the welding wire source 114 to the wire feed rollers 158. The external wire guide assembly 152 avoids, or at minimum mitigates, inlet guide wear issues at the drive roll assembly 164 and improves longevity of the drive roll assembly 164 by presenting welding wire 112 without the added side loads and force that are presented by heavy wire on a large wire spool 148. While the external wire guide assembly 152 will be primarily described in connection with a horizontally-mounted wire spool 148, it can alternatively be used with vertically mounted spools and drive assemblies.

Figure 2A:
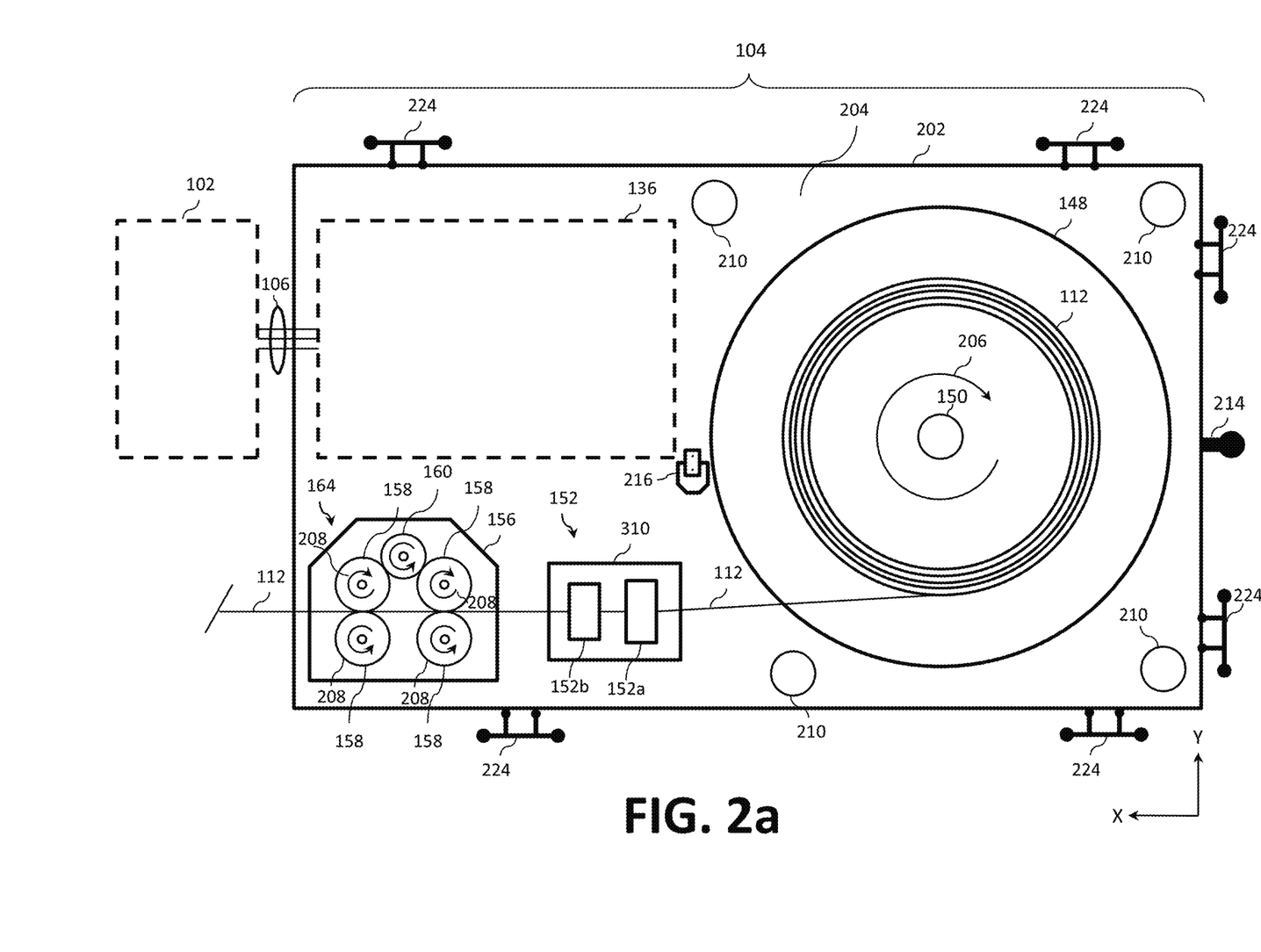
FIG. 2a illustrates a top plan view of an example implementation of the welding-type system of FIG. 1.
Figure 2B:
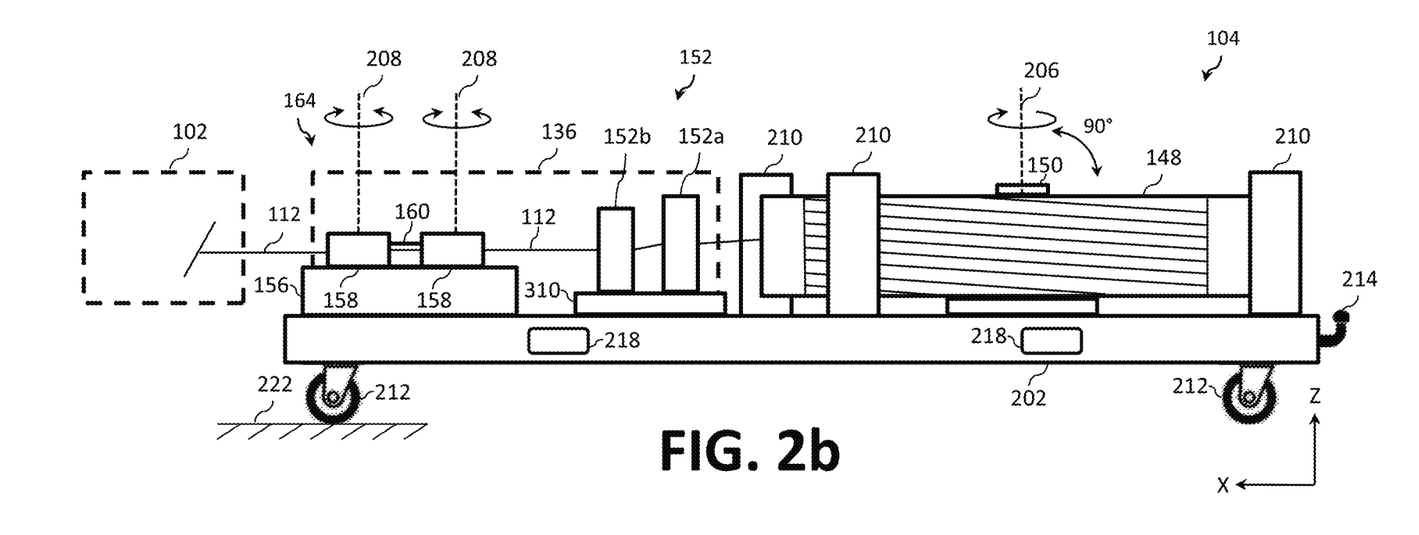
FIG. 2b illustrates a side view of the example implementation of the welding-type system of FIG. 1.

FIGS. 2a and 2b illustrate, respectively, top plan and side elevation views of an example implementation of the welding-type system 100 of FIG. 1. As illustrated, the wire feed controller 136, drive roll assembly 164, external wire guide assembly 152, and wire spool 148 may be positioned on a base platform 202. The base platform 202 may be generally planar to define a horizontal surface 204 to which the various components are attached, such as the wire feed controller 136, drive roll assembly 164, external wire guide assembly 152, and wire spool 148.

Unlike traditional wire-feeder systems, each of the wire spool 148 and drive roll assembly 164 are mounted horizontally on the horizontal surface 204. For example, wire spool 148 is mounted to the horizontal surface 204 of the base platform 202 and configured rotate about a spool axis of rotation 206 via the spool hub 150. As illustrated, the spool axis of rotation 206 is substantially perpendicular to the horizontal surface 204. Mounting the wire spool 148 horizontally also allows for a lower provide, single component wire spool cover. For example, the wire spool cover may be shaped as a short cylinder (e.g., the height being dictated by height of the wire spool 148 in the Z-direction) with an open end to allow the wire spool cover to fit over and enclose the wire spool 148.

While the spool axis of rotation 206 is illustrated as 90 degrees relative to the horizontal surface 204, those of skill in the art would appreciate that the spool axis of rotation 206 may not be exactly 90 degrees, rather, the spool axis of rotation 206 can deviate from the 90 degrees. To that end, in one example, the spool axis of rotation 206 may be mounted at an angle that is between 45 and 90 degrees. In another example, the spool axis of rotation 206 may be mounted at an angle that is between 80 and 90 degrees relative to the horizontal surface 204. In yet another example, the spool axis of rotation 206 may be mounted at an angle that is between 85 and 90 degrees relative to the horizontal surface 204.

A horizontally-mounted wire spool 148 works in conjunction with the external wire guide assembly 152 to improve wire feeding of large wire spools. For example, a horizontally-mounted wire spool 148 improves the weight distribution of the wire-feeder system 104 with the wire spool 148 loaded, thus improving the weld operator's ability to move the wire-feeder system 104 around the job site to a welding location, whether via a cart, sled, power source, etc. Weight distribution also improves a crane's ability to lift the wire-feeder system 104, as well as proving storage of the wire-feeder system 104 with a more compact design with a lower center of gravity. A low center of gravity enable use of a very low and compact transportation sled on slides to allow for improved mobility, safety, and use on multiple surfaces and job sites. A horizontal feeder concept coupled with the external wire guide assembly 152 also facilitates a quick change single touch wire spool change.

In some examples, the wire spool 148 may be locked in place on the spool hub 150. For example, a locking mechanism may prevent the wire spool 148 from spinning on the spool hub 150 (e.g., which may occur without a locking mechanism when the welding wire source 114 is moved) except for when an operator manually feeds wire through the guide 152 or when the drive components of the feeder pull the wire through the guide 152.

The drive roll assembly 164 includes one or more sets of drive rollers 158 configured to drive welding wire 112 from the wire spool 148, through the wire guide assembly 152, and to a welding torch 118. As illustrated, each of the drive rollers 158 is configured to rotate about a roller axis of rotation 208 that is substantially perpendicular to the horizontal surface 204.

The components of the wire feed controller 136, drive roll assembly 164, external wire guide assembly 152, and wire spool 148 may be modular to enable the operator to quickly replace components in the event a malfunction occurs. In other aspect, a modular configuration enables an operator to use or repurpose an existing device as the base platform 202. For example, a wooden pallet may be used as the base platform 202, if desired. Further, a modular configuration allows disassembly or removal of components without disassembly the entire system. For example, the drive assembly or portions thereof can be removed while leaving the motor in place. As a result, a larger motor can be used and replaceable parts can be installed with the motor in situ.

The external wire guide assembly 152 is configured to guide wire from the wire spool 148 to the outlet. In some examples, the wire guide assembly 152 is configured to guide wire having a diameter that is between 1/16 and 1/8 inches. In some examples, the wire guide assembly 152 is configured to guide 3/32 or 1/8 inch wire. As will be describe below, the illustrated wire guide assembly 152 comprises a first guide feature 152a having a first wire pass-through 302a and a second guide feature 152b having a second wire pass-through 302b. Each of the first guide feature 152a and the second guide feature 152b are coupled to a guide base 310 and configure to extend upward from the horizontal surface 204. While a guide base 310 is illustrated, the first guide feature 152a and the second guide feature 152b may be coupled directly to the horizontal surface 204, thereby obviating the need for a guide base 310.

While the first guide feature 152a and the second guide feature 152b are illustrated as rectangular prisms shaped to define the first and second wire pass-throughs 302a, 302b, other shapes are completed, such as cylindrical features, a rectangular frame, a flat panel with a pass-through, or the like. As illustrated, the first guide feature 152a is positioned between the wire spool 148 and the second guide feature 152b. In this arrangement, the first guide feature 152a serves as the inlet to the external wire guide assembly 152 and the second guide feature 152b serves as the outlet to the external wire guide assembly 152.

Figure 3A:
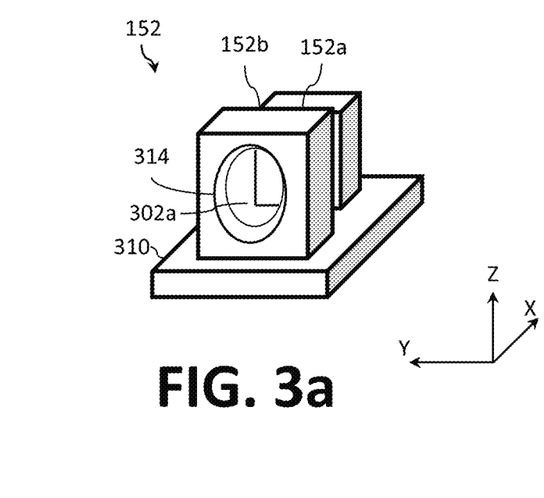
FIG. 3a illustrates a front perspective view of an example wire guide assembly according to a first aspect.
Figure 3B:
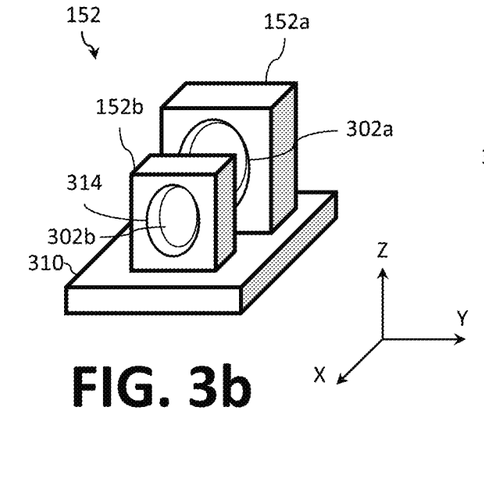
Figure 3C:
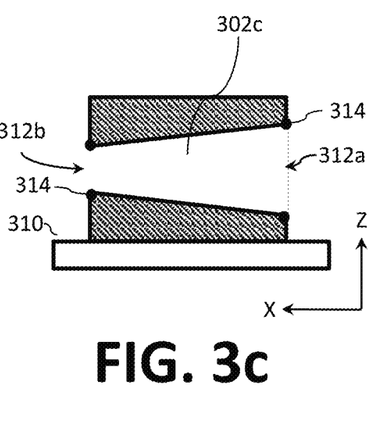
FIG. 3c illustrates a cross-sectional side view of an example wire guide assembly according to a second aspect.

FIG. 3a illustrates a front perspective view (the inlet side) of the wire guide assembly 152, while FIG. 3b illustrates a rear perspective view (the outlet side) of the wire guide assembly 152 according to a first aspect. FIG. 3c illustrates a cross-sectional side view of an example wire guide assembly 152 according to a second aspect, where the wire guide assembly 152 has a tapered wire pass-through 302c (e.g., shaped as a conical frustum). In either example, the wire guide assembly 152 may be rounded or beveled at its edges 314 to reduce friction and/or scraping of the welding wire 112 as it passes through the wire pass-through. In other aspects, the wire guide assembly 152 may include bearings (e.g., ball bears) or similar devices to reduce friction between the welding wire 112 and the wire guide assembly 152 (e.g., at the wire pass-through).

In certain aspects, the first guide feature 152a and the second guide feature 152b may be modular to enable easy replacement or adjustment of one or both guide features 152a, 152b in the event of damage, wear and tear, etc. For example, the first guide feature 152a (as an inlet) may experience greater wear and tear than the second guide feature 152b (as an outlet), thus it may be advantageous (e.g., more cost efficient) to replace just the first guide feature 152a. To that end, the first guide feature 152a and the second guide feature 152b may be removably coupled to the wire guide assembly 152 or the base platform 202. For example, the first guide feature 152a and the second guide feature 152b may be removably coupled to the guide base 310 or directly to the horizontal surface 204 of the base platform 202 via one or more mechanical fasteners 112, such as screws, bolts, clips, snaps, etc. Further, the first guide feature 152a and the second guide feature 152b may be repositioned relative to one another to accommodate a particular wire guide path. In one example, the guide base 310 (or horizontal surface 204) may including multiple attachment points to enable the user to adjust the spacing and/or angle between the first guide feature 152a and the second guide feature 152b or position relative to the drive roll assembly 164 or the wire spool 148.

As illustrated in FIGS. 3a and 3b, the first wire pass-through 302a may be larger than the second wire pass-through 302b. In operation, the larger first wire pass-through 302a helps to guide the welding wire 112 as the wire unspools toward the smaller second wire pass-through 302b. As can be appreciated, the welding wire 112 moves laterally as it unspools from the wire spool 148. A larger first wire pass-through 302a helps to reduce wear at the first point of contact of the external wire guide assembly 152, while also helping to control and guide the welding wire 112 toward the second wire pass-through 302b. The second wire pass-through 302b, in turn, further restricts the lateral movement of the welding wire 112 before passing the welding wire 112 to the drive roll assembly 164. In lieu of two separate guide features, a single guide feature may be provided with a single wire pass-through, for example, as illustrated in FIG. 3c. As illustrated, the guide feature may define a wire pass-through (e.g., a tunnel) that is tapered from the inlet 312a to the outlet 312b. In this example, the larger end of the tapered wire pass-through 302c serves the function of the inlet 312a, akin to the first wire pass-through 302a, while the smaller end of the single wire pass-through serves the function of the outlet 312b, akin to the second wire pass-through 302b.

Referring back to FIGS. 2a and 2b, the base platform 202 may be fabricated form metal, wood, plastic, composites, or a combination thereof. In certain aspects, the base platform 202 may be a repurposed structure, such as a wooden pallet. The topside (i.e., the horizontal surface 204) and underside are preferable planar (i.e., flat) to enable stacking, loading, and ease of portability.

The base platform 202 may comprises a plurality of supports 210 to support a second wire-feeder system 104b above the horizontal surface 204 of a first wire-feeder system 104a. Each of the plurality of supports 210 may be shaped as a column, post, block, or the like and can be fabricated from metal, wood, plastic, composites, or a combination thereof. The height of the plurality of supports 210 may be dictated by the height of the tallest object mounted to the horizontal surface 204, thereby ensuring proper clearance when a second wire-feeder system 104b is stacked on the first wire-feeder system 104a. The plurality of supports 210 may comprise at least three supports 210 to support a base platform 202 of the second wire-feeder system 104b, but additional supports 210 may be provided (e.g., one at each corner of the base platform 202).

As a result of this configuration, the wire-feeder system 104 may be configured to easily stack (e.g., multiple wire-feeder system 104 can be stacked on top of each other). Stacking the wire-feeder systems 104 minimizes space taken up by the multiple wire-feeder systems 104 thereby enabling a job site to preserve valuable floor space without sacrificing production. Stacking the wire-feeder systems 104 also allows for welding operation to continue when a wire spool 148 is depleted by allowing the operator to switch wire-feeder systems 104 while a spool is replaced. In some examples, an operator may have multiple wire-feeder systems 104, and can quickly replace one wire-feeder system 104 with another wire-feeder system 104 in the event of a malfunction or when the wire spool 148 is spent.

Figure 4:
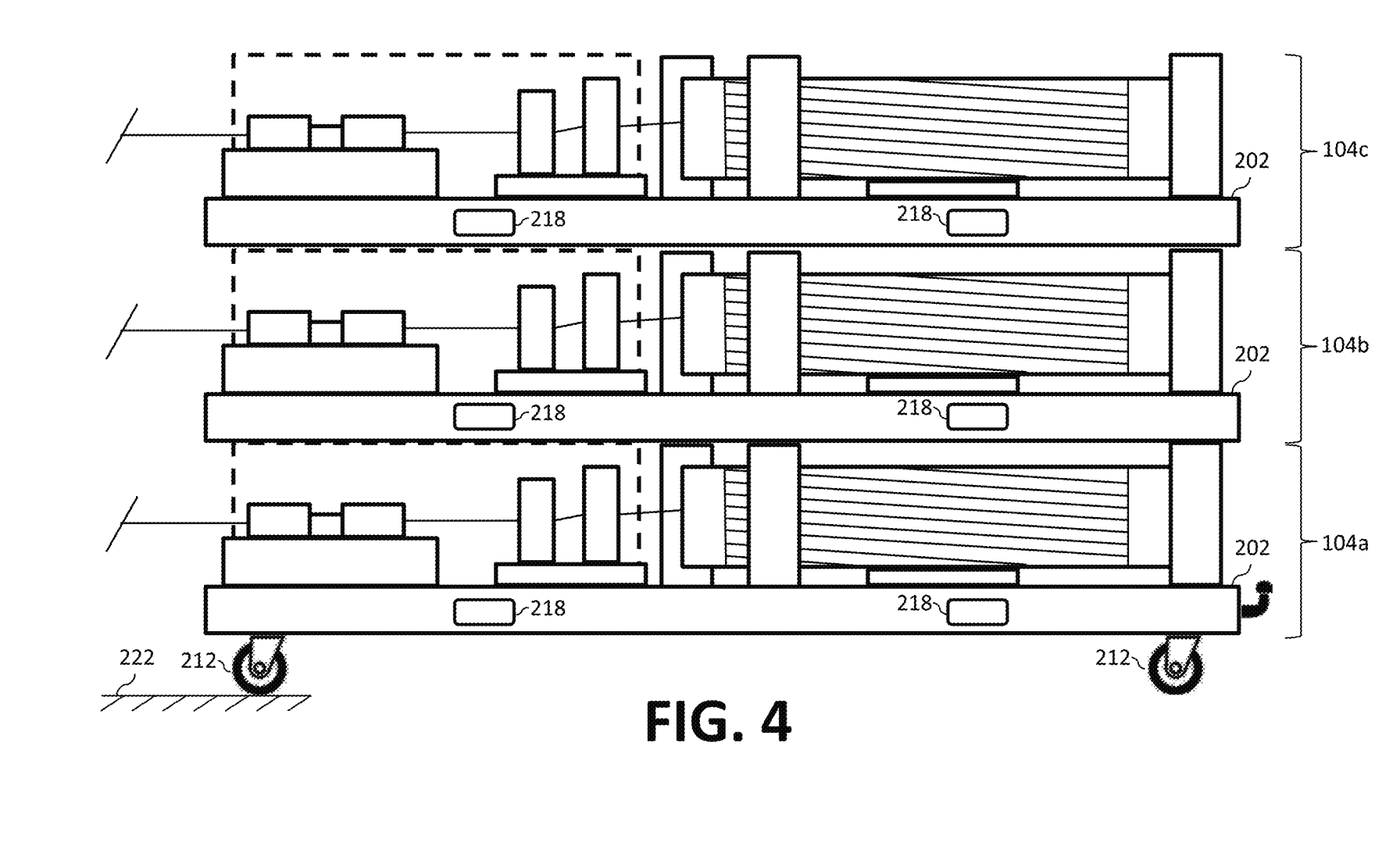
FIG. 4 illustrates three example wire feeders systems stacked upon one another, in accordance with aspects of this disclosure.
Figure 5:
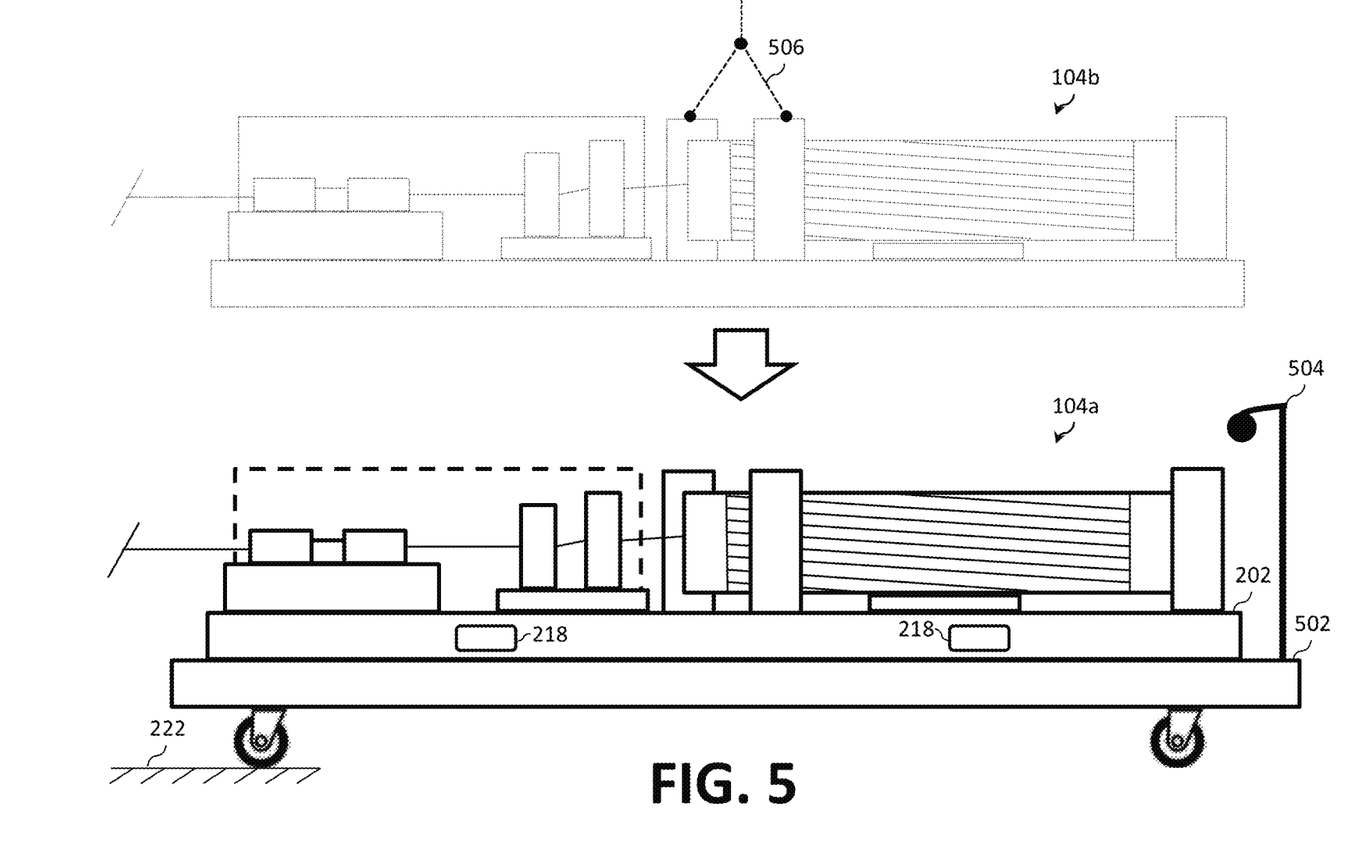
FIG. 5 illustrates two example wire feeders systems stacked upon a hand cart, in accordance with aspects of this disclosure.

By way of illustration, FIG. 4 illustrates an example where three wire feeders systems (illustrated as a first wire-feeder system 104a, a second wire-feeder system 104b, and a third wire-feeder system 104c) are stacked on top of one another, where the bottom-most first wire-feeder system 104a further comprises a plurality of wheels 212. Similarly, FIG. 5 illustrates an example where two wire feeders (illustrated as a first wire-feeder system 104a and a second wire-feeder system 104b) are stacked on a hand cart 502 (or other wheeled or mobile structure, such as a dolly, sled, vehicle, portable power source, etc.). In the illustrated example, the second wire-feeder system 104b can be lowered onto the first wire-feeder system 104a via a cable 506 (or a rope).

In operation, an operator can quickly switch from one wire source to another wire source (e.g., disconnect one wire-feeder system 104 from the power supply 102 and connect a different wire-feeder system 104). In some examples, different wire sources 15 may include different wire types (e.g., wire size or wire material). For example, an operator may have two or more wire-feeder systems 104, each with a different type of welding wire 112. Various welding operations may require the use of a different wire type. For example, one operation may require ⅛ inch wire while a second operation may require 3/32 inch wire. An operator may connect the wire-feeder system 104 including the appropriate wire type for the particular operation to the power supply 102. Then, when the operator performs a different second welding operation that requires a different wire type, the operator can disconnect the first wire-feeder system 104a from the wire feeder and connect a second wire-feeder system 104b that includes the appropriate wire type for the second welding operation.

To increase mobility, the base platform 202 may comprise a plurality of wheels 212 (e.g., casters, which may include a braking function, directional wheel lock, etc.) on the underside (i.e., the surface opposite the horizontal surface 204) to allow the base platform 202 to move across a surface 222 (e.g., the ground, floor, etc.). While wheels 212 are illustrated, other devices are contemplated depending on the type of surface 222, such as skids, floats, etc. In another aspect, one or more wire-feeder systems 104 may instead be stacked and/or mounted to (or otherwise ported by) a hand cart 502, which may include a push/pull handle 504. The push/pull handle 504 may be removable from hand cart 502 or foldable to facilitate compact storage. In certain aspects, the wire-feeder systems 104 may include carrying handles 224. For example, as illustrated in FIG. 2a, the carrying handles 224 may be positioned at the edges or on the sides of the base platform 202 and may be spaced around the base platform 202 to enable for two or more people to carry it. An example of which is illustrated in FIG. 5, where the second wire-feeder system 104b is shown in broken lines. The base platform 202 may further include a tow coupler 214 (illustrated as a trailer hitch with a ball) to enable attachment of a wheeled base platform 202 to a vehicle or another base platform 202 (e.g., as part of a train).

The base platform 202 may further comprises a set of forklift pockets 218 to enable a fork lift to readily transport and/or stack the wire-feeder systems 104. In some example, each side of the base platform 202 may comprises a set of forklift pockets 218 to enable the fork lift to approach and lift the wire-feeder system 104 from any direction.

In some examples, the base platform 202 comprises one or more hoist attachments 216 (e.g., rings, shackles, etc.) to enable the base platform 202 to be suspended by a crane or other hoist via a cable 506. The hoist attachment(s) 216 may be positioned such that the base platform 202 is level relative to the surface 222 when suspended via the cable 506 (e.g., at the center of gravity in the X-Y plane so as to avoid tipping).

Figure 6:
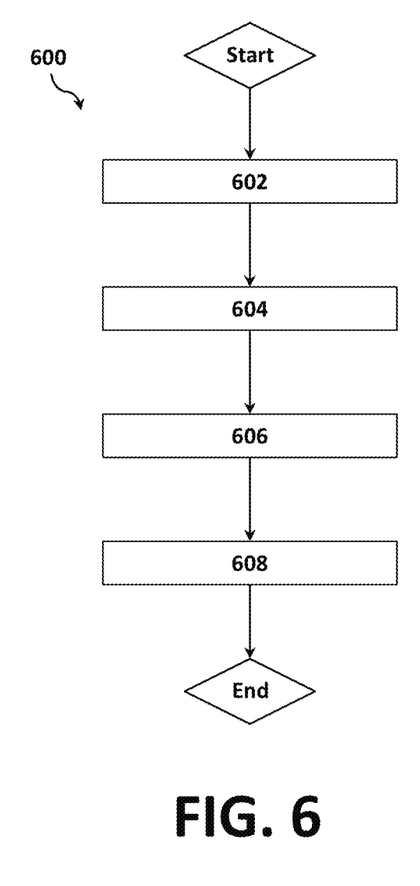
FIG. 6 illustrates an example method for configuring a wire-feeder system in a welding-type system.

FIG. 6 illustrates an example method 600 for configuring a wire-feeder system 104 in a welding-type system 100. At step 602, a wire spool 148 is mounted to a horizontal surface of a base platform such that the wire spool 148 is configured to rotate about a spool axis of rotation 206 that is perpendicular to the horizontal surface. At step 604, welding wire 112 is passed from the wire spool 148 to a wire guide assembly 152 that is separate from the wire spool 148. At step 606, the welding wire 112 is driven from the wire guide assembly 152 to a welding torch 118 via a drive roll assembly 164 having one or more sets of drive rollers 158. At step 608, a second wire-feeder system 104b is stacked on top of the wire-feeder system 104a. The second wire-feeder system 104b may be supported by, for example, supports 210 on the wire-feeder system 104a.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A wire-feeder system comprising:
a base platform, wherein the base platform comprises a plurality of supports to support a second wire-feed system above the base platform;
a spool hub mounted to the base platform perpendicular to the base platform and configured to support a wire spool;
a drive roll assembly mounted to the base platform, and having one or more sets of drive rollers configured to feed wire from the wire spool toward a welding torch; and
a wire guide assembly mounted to the base platform separately from both the wire spool and the drive roll assembly, the wire guide assembly configured to guide the wire from the wire spool supported on the spool hub to the one or more sets of drive rollers.

2. The wire-feeder system of claim 1, wherein each drive roller of the one or more sets of drive rollers is configured to rotate about an axis of rotation that is perpendicular to the base platform.

3. The wire-feeder system of claim 1, wherein the base platform is horizontal.

4. The wire-feeder system of claim 1, wherein the plurality of supports comprises at least three supports to support a base platform of the second wire-feeder system.

5. The wire-feeder system of claim 1, wherein the wire guide assembly comprises a first guide feature having a first wire pass-through and a second guide feature having a second wire pass-through, wherein each of the first guide feature and the second guide feature protrude from the base platform.

6. The wire-feeder system of claim 5, wherein the first guide feature and the second guide feature are each removably coupled to the wire guide assembly.

7. The wire-feeder system of claim 5, wherein the first guide feature is positioned between the wire spool and the second guide feature.

8. The wire-feeder system of claim 7, wherein the first wire pass-through is larger than the second wire pass-through.

9. The wire-feeder system of claim 1, wherein the wire guide assembly comprises a wire pass-through that is tapered from an inlet to an outlet.

10. The wire-feeder system of claim 1, wherein the base platform comprises a plurality of wheels to allow the base platform to move across a surface.

11. The wire-feeder system of claim 1, wherein the base platform comprises a set of forklift pockets.

12. The wire-feeder system of claim 1, wherein the base platform comprises a hoist attachment to enable the base platform to be suspended.

13. The wire-feeder system of claim 1, wherein the wire-feeder system is configured to drive wire having a diameter that is between $1/16$ and $1/8$ inches.

14. A method for configuring a wire-feeder system in a welding-type system, the method comprising:
   loading a wire spool to a spool hub mounted to a base platform, wherein the spool hub is perpendicular to the base platform;
   passing welding wire from the wire spool to a wire guide assembly that is separate from the wire spool, wherein the wire guide assembly comprises a first guide feature having a first wire pass-through and a second guide feature having a second wire pass-through; and
   driving the welding wire from the wire guide assembly to a welding torch via a drive roll assembly having one or more sets of drive rollers.

15. The method of claim 14, further comprising the step of stacking a second wire-feeder system on top of the wire-feeder system.

16. The method of claim 14, wherein each drive roller of the one or more sets of drive rollers is configured to rotate about an axis of rotation that is perpendicular to the base platform.

17. A wire-feeder system comprising:
   a base platform;
   a spool hub mounted to the base platform perpendicular to the base platform and configured to support a wire spool;
   a drive roll assembly mounted to the base platform, and having one or more sets of drive rollers configured to feed wire from the wire spool toward a welding torch, wherein each drive roller of the one or more sets of drive rollers is configured to rotate about an axis of rotation that is perpendicular to the base platform; and
   a wire guide assembly mounted to the base platform separately from both the wire spool and the drive roll assembly, the wire guide assembly configured to guide the wire from the wire spool supported on the spool hub to the one or more sets of drive rollers, wherein the wire guide assembly comprises a first guide feature having a first wire pass-through and a second guide feature having a second wire pass-through.

18. The wire-feeder system of claim 17, wherein the first guide feature is positioned between the wire spool and the second guide feature, and wherein the first wire pass-through is larger than the second wire pass-through.

19. The wire-feeder system of claim 17, wherein the base platform comprises a set of forklift pockets.

20. The wire-feeder system of claim 17, wherein the base platform comprises a plurality of supports to support a second wire-feeder system stacked above the base platform.

21. The wire-feeder system of claim 17, wherein the wire-feeder system is configured to drive wire having a diameter that is between $1/16$ and $1/8$ inches.

* * * * *